(12) United States Patent
Harris et al.

(10) Patent No.: US 11,453,300 B2
(45) Date of Patent: Sep. 27, 2022

(54) ELECTRIC VEHICLE SUPPLY EQUIPMENT CABLES WITH GAP EXTRUSIONS

(71) Applicant: FORD GLOBAL TECHNOLOGIES, LLC, Dearborn, MI (US)

(72) Inventors: Timothy Harris, Grosse Ile, MI (US); Kevin Schneier, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/986,620

(22) Filed: Aug. 6, 2020

(65) Prior Publication Data

US 2022/0041073 A1 Feb. 10, 2022

(51) Int. Cl.

| B60L 53/18 | (2019.01) |
|---|---|
| H01B 7/02 | (2006.01) |
| H01B 7/04 | (2006.01) |
| H01B 7/18 | (2006.01) |
| H01R 24/00 | (2011.01) |
| H02G 11/00 | (2006.01) |
| B60L 53/16 | (2019.01) |
| H01B 9/00 | (2006.01) |

(52) U.S. Cl.
CPC ............. *B60L 53/18* (2019.02); *B60L 53/16* (2019.02); *H01B 7/0241* (2013.01); *H01B 7/041* (2013.01); *H01B 7/1895* (2013.01); *H01B 9/00* (2013.01); *H02G 11/00* (2013.01)

(58) Field of Classification Search
CPC ..... H01B 7/1895; H01B 7/0241; B60L 53/16; B60L 53/18
See application file for complete search history.

(56) References Cited

U.S. PATENT DOCUMENTS

| 2,544,233 | A | 3/1951 | Kennedy |
|---|---|---|---|
| 4,005,168 | A | 1/1977 | Whitfill, Jr. et al. |
| 2011/0024151 | A1 | 2/2011 | Eshima et al. |
| 2016/0133355 | A1* | 5/2016 | Glew ................. H01B 1/22 248/49 |
| 2020/0219638 | A1* | 7/2020 | Williams ............ H01B 7/423 |
| 2020/0303093 | A1* | 9/2020 | Cantz ................. H01B 7/425 |

FOREIGN PATENT DOCUMENTS

| CN | 203760137 U | 8/2014 |
|---|---|---|
| CN | 104091631 A2 | 10/2014 |

* cited by examiner

*Primary Examiner* — Hoa C Nguyen
*Assistant Examiner* — Amol H Patel
(74) *Attorney, Agent, or Firm* — David B. Kelley; Carlson, Gaskey & Olds, P.C.

(57) ABSTRACT

This disclosure describes electric vehicle supply equipment (EVSE) assemblies for use when charging plug-in electrified vehicles. An exemplary EVSE assembly may include a charger coupler and a cable connected to the charger coupler. The cable may include a plurality of conductor wires and a gap extrusion positioned within a gap between the plurality of conductor wires. The gap extrusion may include a non-symmetrical cross-sectional shape and may be made of a thermoplastic elastomer (TPE) material. The cable may be manufactured in a staggered extrusion process in which the gap extrusion is fed into a gap of a wound conductor wire bunch of the cable.

19 Claims, 4 Drawing Sheets

ELECTRIC VEHICLE SUPPLY EQUIPMENT CABLES WITH GAP EXTRUSIONS

TECHNICAL FIELD

This disclosure relates generally to electric vehicle supply equipment (EVSE) assemblies that include cables with gap extrusions for filling gaps between conductor wires inside the cables.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Some electrified vehicles, such as plug-in hybrid electric vehicles (PHEVs) and battery electric vehicles (BEVs), include a charge port that is connectable to a charger coupler of electric vehicle supply equipment (EVSE) for charging the traction battery pack. A cable of the EVSE connects the charger coupler to an external power source for supplying power to the charge port.

SUMMARY

An electric vehicle supply equipment (EVSE) assembly according to an exemplary aspect of the present disclosure includes, among other things, a charger coupler and a cable connected to the charger coupler and including a plurality of conductor wires and a gap extrusion positioned within a gap between the plurality of conductor wires. The gap extrusion includes a non-symmetrical cross-sectional shape.

In a further non-limiting aspect of the foregoing assembly, the cable includes an outer jacket circumferentially disposed about the plurality of conductor wires.

In a further non-limiting aspect of either of the foregoing assemblies, the outer jacket and the gap extrusion are both made from a thermoplastic elastomer (TPE) material.

In a further non-limiting aspect of any of the foregoing assemblies, the outer jacket and the gap extrusion are made from the same TPE material.

In a further non-limiting aspect of any of the foregoing assemblies, the gap extrusion extends along a rotated path about a central longitudinal axis to establish a helical orientation.

In a further non-limiting aspect of any of the foregoing assemblies, the helical orientation follows a twisted path of the gap.

In a further non-limiting aspect of any of the foregoing assemblies, the helical orientation includes a plurality of concave grooves. Each of the plurality of concave grooves extends between adjacent distal points of the gap extrusion.

In a further non-limiting aspect of any of the foregoing assemblies, the gap extrusion extends lengthwise along a central longitudinal axis, a first axis bisects the gap extrusion along a first dimension of a cross-sectional slice of the gap extrusion, and a second axis bisects the gap extrusion along a second dimension of the cross-sectional slice of the gap extrusion.

In a further non-limiting aspect of any of the foregoing assemblies, the second axis is perpendicular to the first axis. Each of the first axis and the second axis is perpendicular to the central longitudinal axis.

In a further non-limiting aspect of any of the foregoing assemblies, the cross-sectional shape is non-symmetric about the first axis or the second axis.

In a further non-limiting aspect of any of the foregoing assemblies, the cross-sectional shape is non-symmetric about both the first axis and the second axis.

In a further non-limiting aspect of any of the foregoing assemblies, the gap extrusion includes a thermoplastic elastomer (TPE) material.

A method according to another exemplary aspect of the preset disclosure includes, among other things, forming a gap extrusion for use within a cable of an electric vehicle supply equipment (EVSE) assembly. The gap extrusion includes a non-symmetrical cross-sectional shape. The method further incudes feeding the gap extrusion into a wound conductor wire bunch to form a cable subassembly, and applying an outer jacket about the cable subassembly to form the cable.

In a further non-limiting embodiment of the foregoing method, forming the gap extrusion includes extruding the gap extrusion in a first extrusion process.

In a further non-limiting embodiment of either of the foregoing methods, applying the outer jacket includes extruding the outer jacket about the cable subassembly in a second extrusion process.

In a further non-limiting embodiment of any of the foregoing methods, the second extrusion process is separate from the first extrusion process to provide a staggered extrusion process.

In a further non-limiting embodiment of any of the foregoing methods, feeding the gap extrusion into the wound conductor wire bunch includes feeding the gap extrusion into a gate of a cable extrusion machine.

In a further non-limiting embodiment of any of the foregoing methods, feeding the gap extrusion into the wound conductor wire bunch includes feeding the gap extrusion into a gap formed between conductor wires of the wound conductor wire bunch.

In a further non-limiting embodiment of any of the foregoing methods, the cross-sectional shape is non-symmetrical about at least one bisecting axis of the cross-sectional shape.

In a further non-limiting embodiment of any of the foregoing methods, the gap extrusion is made of a thermoplastic elastomer (TPE) material.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
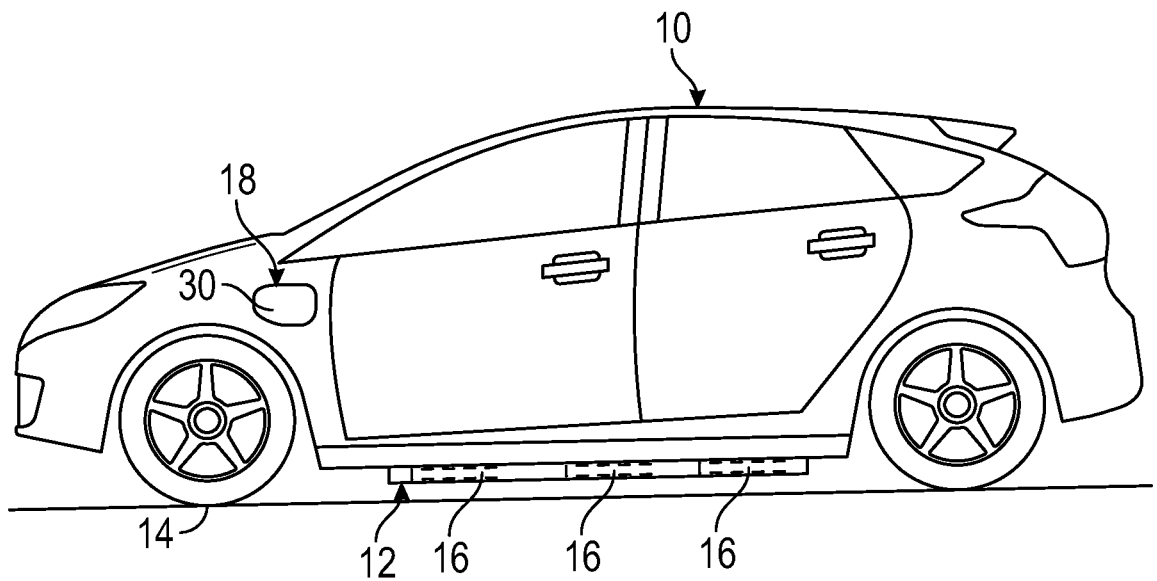
FIG. 1 is a side view of an electrified vehicle equipped with a charge port assembly.
Figure 2:
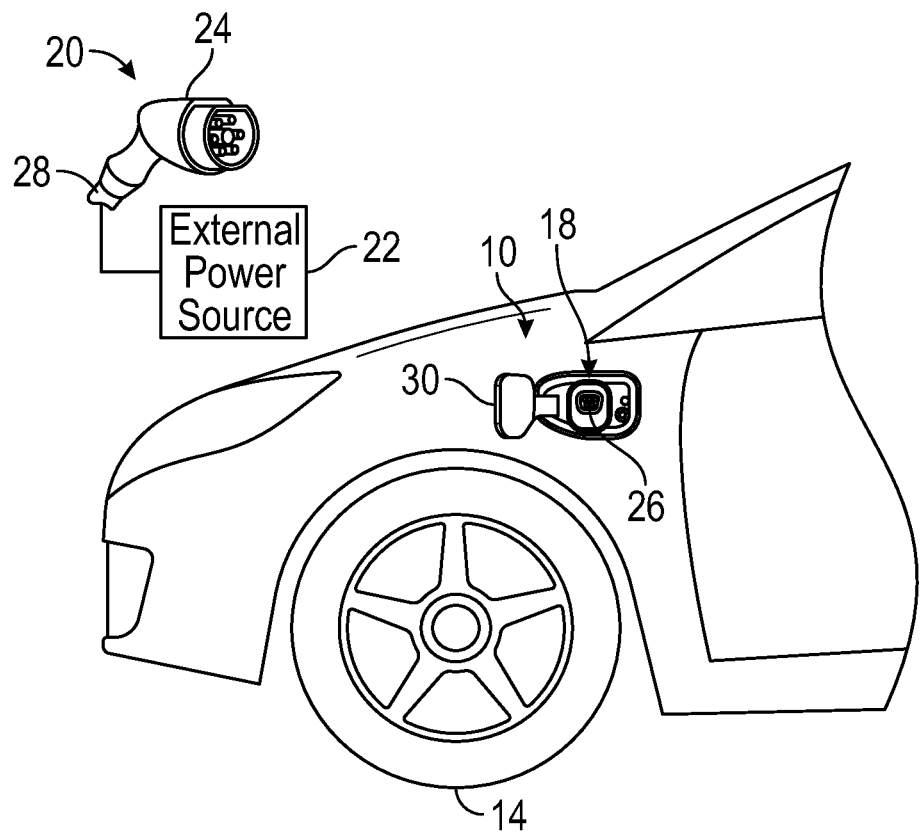
FIG. 2 is an enlarged view of the charge port assembly of the electrified vehicle of FIG. 1.

This disclosure describes electric vehicle supply equipment (EVSE) assemblies for use when charging plug-in electrified vehicles. An exemplary EVSE assembly may include a charger coupler and a cable connected to the charger coupler. The cable may include a plurality of conductor wires and a gap extrusion positioned within a gap between the plurality of conductor wires. The gap extrusion may include a non-symmetrical cross-sectional shape and may be made of a thermoplastic elastomer (TPE) material. The cable may be manufactured in a staggered extrusion process in which the gap extrusion is fed into a gap of a wound conductor wire bunch of the cable. These and other features are described in greater detail in the following paragraphs of this detailed description FIGS. 1 and 2 illustrate an exemplary electrified vehicle 10 that includes a traction battery pack 12. The electrified vehicle 10 may include any electrified powertrain capable of applying a torque from an electric machine for driving drive wheels 14 of the electrified vehicle 10. In an embodiment, the electrified vehicle 10 is a plug-in hybrid electric vehicle (PHEV). In another embodiment, the electrified vehicle is a battery electric vehicle (BEV). Therefore, the powertrain may electrically propel the drive wheels 14 either with or without the assistance of an internal combustion engine.

The electrified vehicle 10 of FIGS. 1-2 is schematically illustrated as a car. However, the teachings of this disclosure may be applicable to any type of vehicle, including but not limited to, cars, trucks, vans, sport utility vehicles (SUVs), etc.

Although shown schematically, the traction battery pack 12 may be a high voltage traction battery pack that includes a plurality of battery arrays 16 (i.e., battery assemblies or groupings of battery cells) capable of outputting electrical power to one or more electric machines of the electrified vehicle 10. Other types of energy storage devices and/or output devices can also be used to electrically power the electrified vehicle 10.

From time to time, charging the traction battery pack 12 may be required or desirable. The electrified vehicle 10 may therefore be equipped with a charge port assembly 18 (sometimes referred to as a vehicle inlet assembly) for charging the energy storage devices (e.g., battery cells) of the traction battery pack 12. An electric vehicle supply equipment (EVSE) assembly 20 may be operably connected between the charge port assembly 18 and an external power source 22 for transferring power therebetween. In an embodiment, the external power source 22 includes utility grid power. In another embodiment, the external power source 22 includes an alternative energy source, such as solar power, wind power, etc. In yet another embodiment, the external power source 22 includes a combination of utility grid power and alternative energy sources. The external power source 22 may be located at a home of the user, a public charging station, etc.

The EVSE assembly 20 may include a charger coupler 24 that can be coupled to a port 26 of the charge port assembly 18 to charge the traction battery pack 12 of the electrified vehicle 10 from the external power source 22. A cable 28 of the EVSE assembly 20 may connect between the charger coupler 24 and a power outlet or charging station that is operably connected to the external power source 22. Although not shown, the EVSE assembly 20 may additionally include a charge circuit interrupting device (CCID) for selectively disabling the transfer of power from the external power source 22 to the charger coupler 24 during various faults.

The charge port assembly 18 may include a charge port door 30 that is closed during typical operation of the electrified vehicle 10. When charging the electrified vehicle 10 from the external power source 22 is desired, the charge port door 30 can move from the closed position shown in FIG. 1 to the open position shown in FIG. 2. A user can then couple the charger coupler 24 of the EVSE assembly 20 to the port 26 of the charge port assembly 18 so that power from the external power source 22 can be provided to the traction battery pack 12 of the electrified vehicle 10 for charging the battery cells contained therein.

The port 26 of the exemplary charge port assembly 18 may be configured to receive AC power from the external power source 22. In another embodiment, the port 26 of the charge port assembly 18 is configured to receive DC power from the external power source 22. In yet another example, the port 26 is a combined AC/DC charge port that is configured to receive AC power, DC power, or both from the external power source 22. The EVSE assembly 20 may thus be configured to provide any level of charging (e.g., level 1, level 2, DC, etc.).

Figure 3:
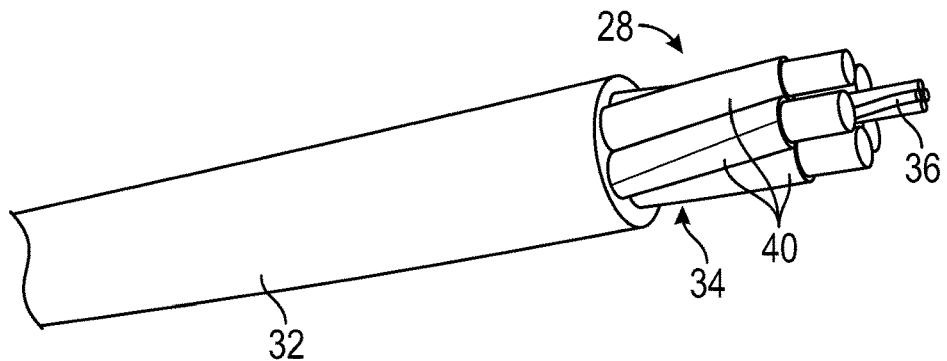
FIG. 3 illustrates a select portion of a cable of an electric vehicle supply equipment (EVSE) assembly.
Figure 4:
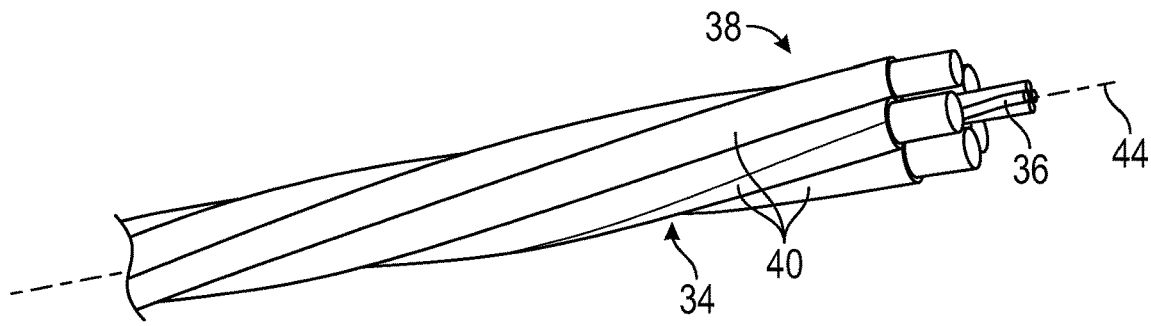
FIG. 4 illustrates a cable subassembly of the cable of FIG. 3.
Figure 5:
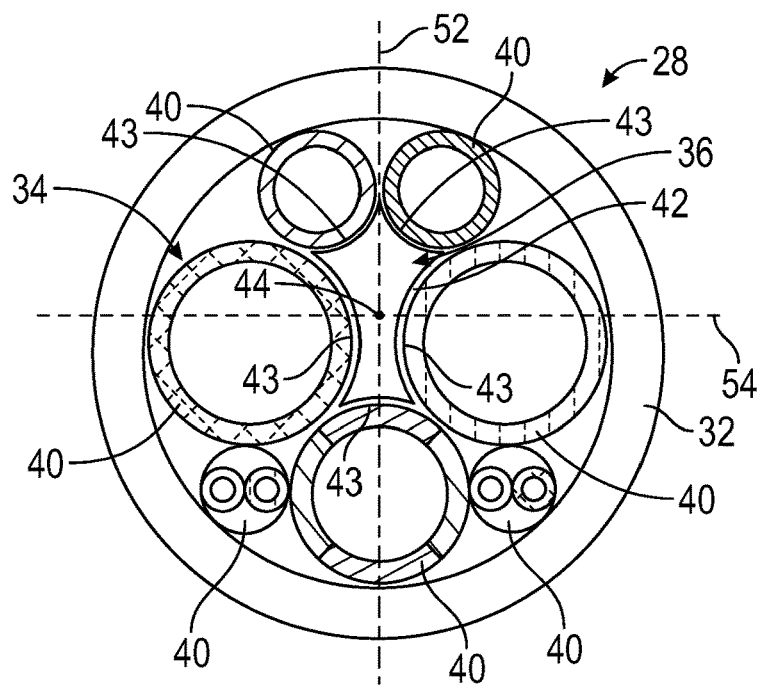
FIG. 5 is a cross-sectional view through section 5-5 of the cable of FIG. 3.

FIGS. 3, 4, and 5 illustrate further details of the cable 28 of the EVSE assembly 20 shown in FIG. 2. The specific size (e.g., length, outer diameter, etc.) of the cable 28 is design dependent and is therefore not intended to limit this disclosure.

The cable 28 may include an outer jacket 32, a wound conductor wire bunch 34, and a gap extrusion 36. Together, the wound conductor wire bunch 34 and the gap extrusion 36 establish a cable subassembly 38 (best shown in FIG. 4) of the cable 28. The outer jacket 32 may be circumferentially disposed about the cable subassembly 38 for establishing an outer annular surface of the cable 28. In an embodiment, the outer jacket 32 is made of a thermoplastic elastomer (TPE) material.

The wound conductor wire bunch 34 may include a plurality of conductor wires 40 that are twisted together to form the wound conductor wire bunch 34. Each of the plurality of conductor wires 40 may be a cylindrical, insulated conductor wire that provides a unique function associated with the charging process when the EVSE assembly 20 is operably coupled to the charge port assembly 18. At least a portion of the plurality of conductor wires 40 may include a different wire gauge than the other conductor wires 40 of the wound conductor wire bunch 34. In an embodiment, the wound conductor wire bunch 34 includes five conductor wires 40. However, the total number of conductor wires 40 provided within the wound conductor wire bunch 34 is not intended to limit this disclosure. Moreover, an additional number of conductor wires 40 may be provided within the cable 28 separately from the wound conductor wire bunch 34.

A gap 42 may extend between the plurality of conductor wires 40 once the wires are twisted together to form the wound conductor wire bunch 34. In an embodiment, the gap 42 is provided between five conductor wires 40. The gap 42 extends along the length of the wound conductor wire bunch 34 and is generally located at the center of the cable 28.

The gap extrusion 36 is a solid extruded structure positioned inside the cable 28 for filling the gap 42. The gap extrusion 36 includes a unique design and material make-up, described in greater detail below, that provides for greater cable torsional strength, moisture resistance, and stability as compared to existing cylindrical, fiberglass fillers.

Referring now to FIGS. 5, 6A, 6B, and 6C, the gap extrusion 36 may be configured to fill the entire gap 42 of the wound conductor wire bunch 34. The gap extrusion 36 may be shaped to provide complete contact with inner surfaces 43 of the conductor wires 40 that surround the gap 42. The inner surfaces 43 face toward the center of the cable 28. The specific size and shape of the gap extrusion 36 is design dependent and can be modified to fill any configuration of the gap 42.

The gap extrusion 36 is rotated in a direction D (e.g., clockwise) about its central longitudinal axis 44 along its entire length to establish a helical orientation 46. The helical orientation 46 follows the twisted path of the gap 42 that is created by twisting the conductor wires 40 together to form the wound conductor wire bunch 34. The helical orientation 46 may establish a plurality of concave groves 48. Each concave groove 48 may extend between adjacent distal points 50 of the gap extrusion 36 and is configured to accommodate the shape of the inner surface 43 of one of the conductor wires 40.

Figure 6A:
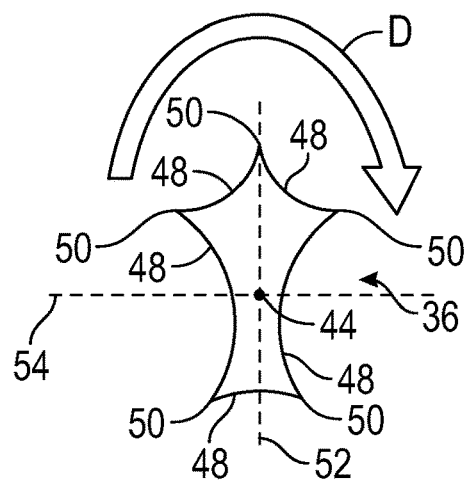
FIGS. 6A, 6B, and 6C illustrate various views of a gap extrusion of the cable of FIGS. 3-5.
Figure 6B:
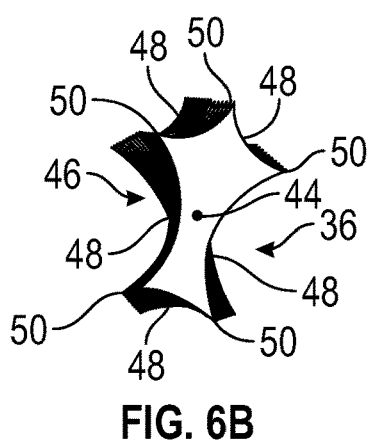
Figure 6C:
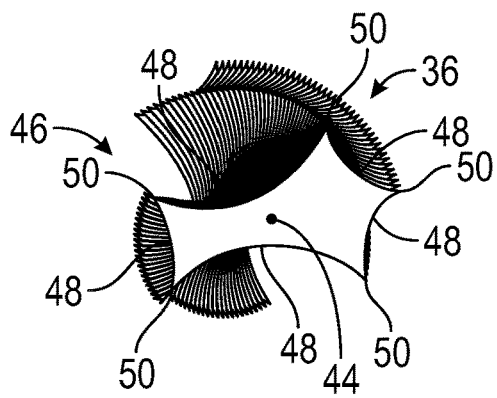

As best shown in FIGS. 5 and 6A, a cross-sectional shape of the gap extrusion 36 may be non-symmetrical. When viewed in cross-section, a first axis 52 and a second axis 54 may bisect the gap extrusion 36. The first axis 52, which may extend across a height or first dimension of the gap extrusion 36, and the second axis 54, which may extend across a width or second dimension of the gap extrusion 36, are each substantially perpendicular to the central longitudinal axis 44. The second axis 54 is substantially perpendicular to the first axis 52.

Figure 7:
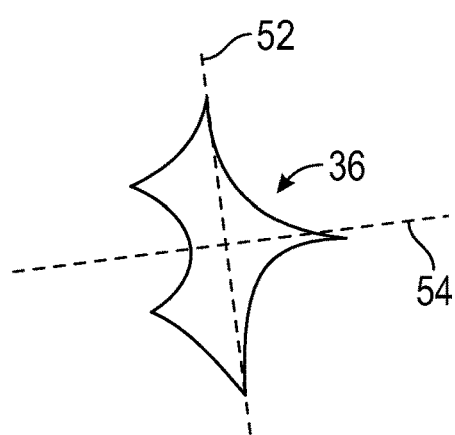
FIG. 7 illustrates another exemplary gap extrusion of a cable.
Figure 8:
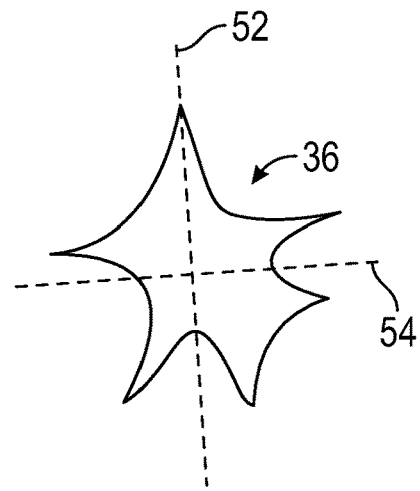
FIG. 8 illustrates yet another exemplary gap extrusion of a cable.

In an embodiment, the cross-sectional shape of the gap extrusion 36 is non-symmetric about the second axis 54 (see FIGS. 5 and 6A). In another embodiment, the cross-sectional shape of the gap extrusion 36 is non-symmetric about the first axis 52 (see FIG. 7). In yet another embodiment, the cross-sectional shape of the gap extrusion 36 is non-symmetric about each of the first axis 52 and the second axis 54 (see FIG. 8). Of course, the specific non-symmetric geometry of the gap extrusion 36 will be design dependent on the shape of the gap 42. The non-symmetrical cross-sectional shape of the gap extrusion 36 helps fill irregularly shaped gaps between the conductor wires 40.

The gap extrusion 36 may be made of a thermoplastic elastomer (TPE) material. In an embodiment, the gap extrusion 36 and the outer jacket 32 are made from the same TPE material. Other suitable materials include but are not limited to polyvinyl chloride (PVC), polyamide nylon (PA), and cross-linked polyolefin (XLPO).

Figure 9:
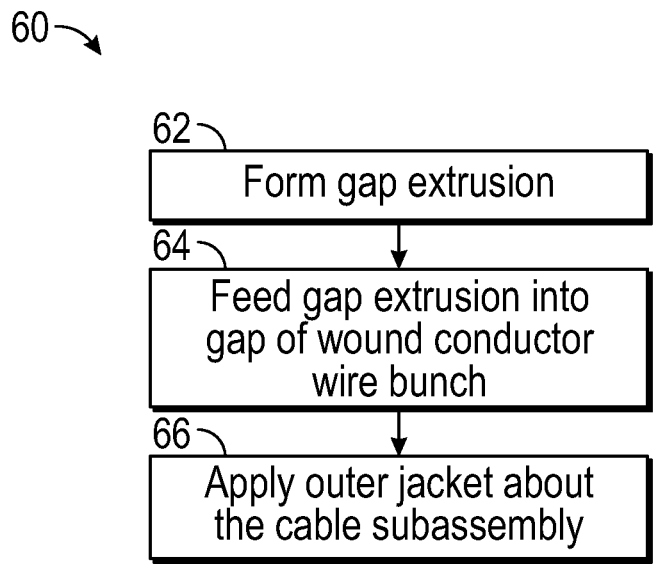
FIG. 9 schematically illustrates a method for manufacturing a cable of an electric vehicle supply equipment (EVSE) assembly.

FIG. 9, with continued reference to FIGS. 1-8, schematically illustrates a method 60 of manufacturing the cable 28 of the EVSE assembly 20 described above. The cable 28 may be manufactured in a staggered extrusion process. First, at block 62, the gap extrusion 36 is formed, such as in a first extrusion process. The gap extrusion 36 may be formed to include a non-symmetrical cross-sectional shape, such as one of cross-sectional shapes shown in FIGS. 5A-8, for example.

Figure 10:
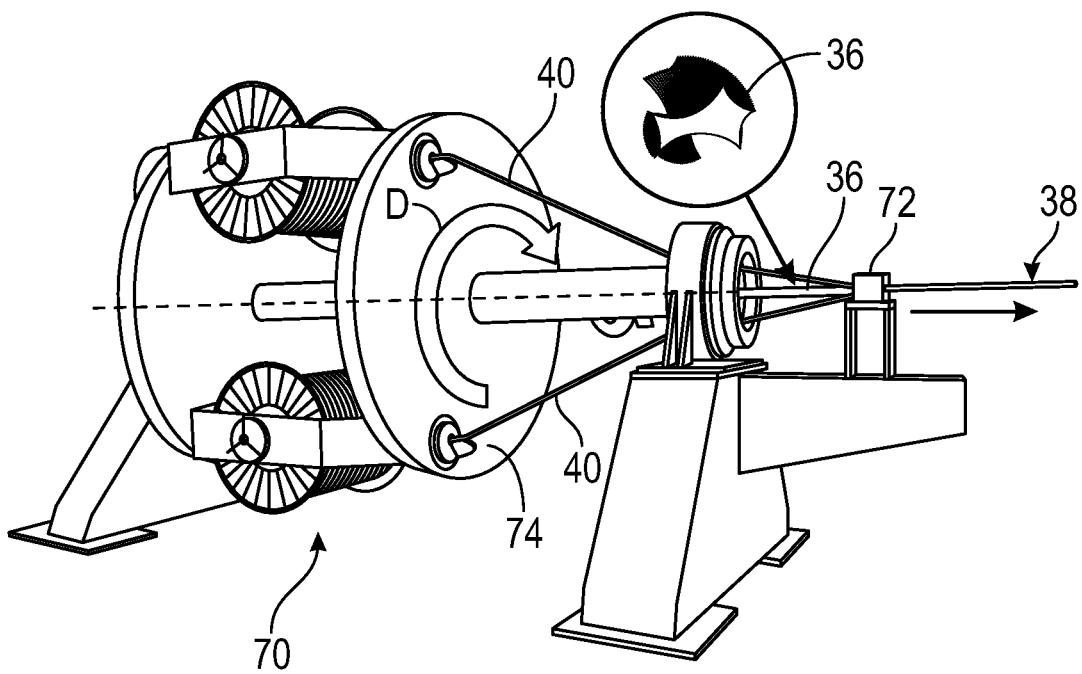
FIG. 10 illustrates a cable extrusion machine for manufacturing a cable of an electric vehicle supply equipment (EVSE) assembly.

Next, at block 64, the gap extrusion 36 may be fed into the gap 42 of the wound conductor wire bunch 34, thereby forming the cable subassembly 38. The gap extrusion 36 may be fed between the conductor wires 40 of the wound conductor wire bunch 34 within a cable extrusion machine 70 (see FIG. 10). The conductor wires 40 and the gap extrusion 36 may be fed through a gate 72 of the cable extrusion machine 70. A barrel 74 of the cable extrusion machine 70 may rotate in a direction D as the conductor wires 40 and the gap extrusion 36 are fed through the gate 72 in order to form the twisted pattern of the cable subassembly 38.

Finally, at block 66, the outer jacket 32 may be applied circumferentially about the cable subassembly 38 to form the cable 28. The outer jacket 32 may be applied in a second extrusion process that is separate from the first extrusion process used to form the gap extrusion 36. The method 60 is therefore considered a staggered extrusion process.

The EVSE assemblies of this disclosure includes cables having rotated, non-symmetrical gap extrusions for filling gaps between conductor wires. The exemplary gap extrusions provide for greater torsional strength and stability compared to existing cylindrical, fiberglass cable fillers by exhibiting greater resistance to bending, twisting, and shifting of the conductor wires. Furthermore, the exemplary gap extrusions substantially eliminate gaps between the conductor wires, thereby reducing capillary action and water ingress throughout the cable axis.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electric vehicle supply equipment (EVSE) assembly, comprising:
   a charger coupler; and
   a cable connected to the charger coupler and including a plurality of conductor wires and a gap extrusion positioned within a gap between the plurality of conductor wires,
   wherein the gap extrusion includes a completely solid structure that completely fills the gap and a non-symmetrical cross-sectional shape.

2. The assembly as recited in claim 1, wherein the cable includes an outer jacket circumferentially disposed about the plurality of conductor wires.

3. The assembly as recited in claim 2, wherein the outer jacket and the gap extrusion are both made from a thermoplastic elastomer (TPE) material.

4. The assembly as recited in claim 3, wherein the outer jacket and the gap extrusion are made from the same TPE material.

5. The assembly as recited in claim 1, wherein the gap extrusion extends along a rotated path about a central longitudinal axis to establish a helical orientation.

6. The assembly as recited in claim 5, wherein the helical orientation follows a twisted path of the gap.

7. The assembly as recited in claim 5, wherein the helical orientation includes a plurality of concave grooves, and further wherein each of the plurality of concave grooves extends between adjacent distal points of the gap extrusion.

8. The assembly as recited in claim 7, wherein each of the distal points extends to a pointed tip.

9. The assembly as recited in claim 1, wherein the gap extrusion extends lengthwise along a central longitudinal axis, a first axis bisects the gap extrusion along a first dimension of a cross-sectional slice of the gap extrusion, and a second axis bisects the gap extrusion along a second dimension of the cross-sectional slice of the gap extrusion.

10. The assembly as recited in claim 9, wherein the second axis is perpendicular to the first axis, and further wherein each of the first axis and the second axis is perpendicular to the central longitudinal axis.

11. The assembly as recited in claim 10, wherein the cross-sectional shape is non-symmetric about the first axis or the second axis.

12. The assembly as recited in claim 10, wherein the cross-sectional shape is non-symmetric about both the first axis and the second axis.

13. The assembly as recited in claim 10, wherein the cross-sectional shape is non-symmetric about the first axis and symmetric about the second axis.

14. The assembly as recited in claim 10, wherein the cross-sectional shape is symmetric about the first axis and non-symmetric about the second axis.

15. The assembly as recited in claim 1, wherein the gap extrusion includes a thermoplastic elastomer (TPE) material.

16. The assembly as recited in claim 1, wherein the gap extrusion fills an entirety of the gap.

17. The assembly as recited in claim 1, wherein the gap extrusion includes a polyamide nylon (PA) material.

18. The assembly as recited in claim 1, wherein the gap extrusion includes a cross-linked polyolefin (XLPO) material.

19. An electric vehicle supply equipment (EVSE) assembly, comprising:
a charger coupler; and
a cable connected to the charger coupler and including a gap extrusion positioned within a gap between a plurality of conductor wires,
the gap extrusion including a solid structure that completely fills the gap and extending lengthwise along a central longitudinal axis, a first axis bisects the gap extrusion along a first dimension of a cross-sectional slice of the gap extrusion, and a second axis bisects the gap extrusion along a second dimension of the cross-sectional slice of the gap extrusion,
the second axis is perpendicular to the first axis, and each of the first axis and the second axis is perpendicular to the central longitudinal axis,
wherein the cross-sectional slice is non-symmetric about the first axis or the second axis and is symmetric about the other of the first axis or the second axis,
wherein the gap extrusion includes a thermoplastic elastomer (TPE) material.

* * * * *